United States Patent [19]
Staub, Jr.

[11] 3,767,366
[45] Oct. 23, 1973

[54] COOLED OXYGEN PRODUCING UNIT

[75] Inventor: Charles H. Staub, Jr., Pittsburgh, Pa.

[73] Assignee: Mine Safety Appliance Company, Pittsburgh, Pa.

[22] Filed: Sept. 21, 1971

[21] Appl. No.: 182,477

[52] U.S. Cl. ............... 23/281, 23/288 K, 23/288 L, 60/39.66, 60/267, 60/268, 126/263, 122/21, 165/104, 165/105, 165/106, 423/579
[51] Int. Cl. .............................................. B01j 7/00
[58] Field of Search .............. 23/281, 288 K, 288 L; 60/39.66, 267, 268; 126/263; 122/21; 165/104, 105, 106; 423/579

[56] References Cited
UNITED STATES PATENTS

| | | | |
|---|---|---|---|
| 3,573,001 | 3/1971 | Bovard | 23/281 |
| 3,182,451 | 5/1965 | Messerly | 60/267 X |
| 2,558,756 | 7/1951 | Jackson et al | 423/579 X |

*Primary Examiner*—James H. Tayman, Jr.
*Attorney*—Brown et al.

[57] ABSTRACT

An oxygen producing candle is surrounded by a metal shell, which in turn is enclosed in a metal housing spaced from the shell. The unit is provided with an oxygen passage connecting the inside of the shell with the outside of the unit for delivery of oxygen therefrom. The space between the shell and housing is filled with absorbent insulation, in which water-filled tubes are embedded around the shell. The ends of these tubes are sealed by means that will be destroyed when heat from the burning candle raises the temperature of the tubes to a predetermined point. The water thereby released from the tubes will vaporize and escape through a vent in the housing in order to remove heat from the unit.

7 Claims, 4 Drawing Figures

PATENTED OCT 23 1973

3,767,366

INVENTOR.
CHARLES H. STAUB, JR.
BY
Brown, Murray, Flick & Peckham
ATTORNEYS.

COOLED OXYGEN PRODUCING UNIT

Oxygen producing units in which oxygen generating candles are burned are well known. Although there may be insulation between such a candle and the surrounding housing and also around the housing, such high temperatures are produced that the outer surface of the unit may become objectionably hot, especially in the absence of convective air to carry off the heat.

It is an object of this invention to provide an oxygen unit of the type just mentioned, in which its outer surface temperature is maintained low enough to be safe for the environment in which it is to be used, even when the unit is small and light weight.

The invention is illustrated in the accompanying drawings, in which

Figure 1:
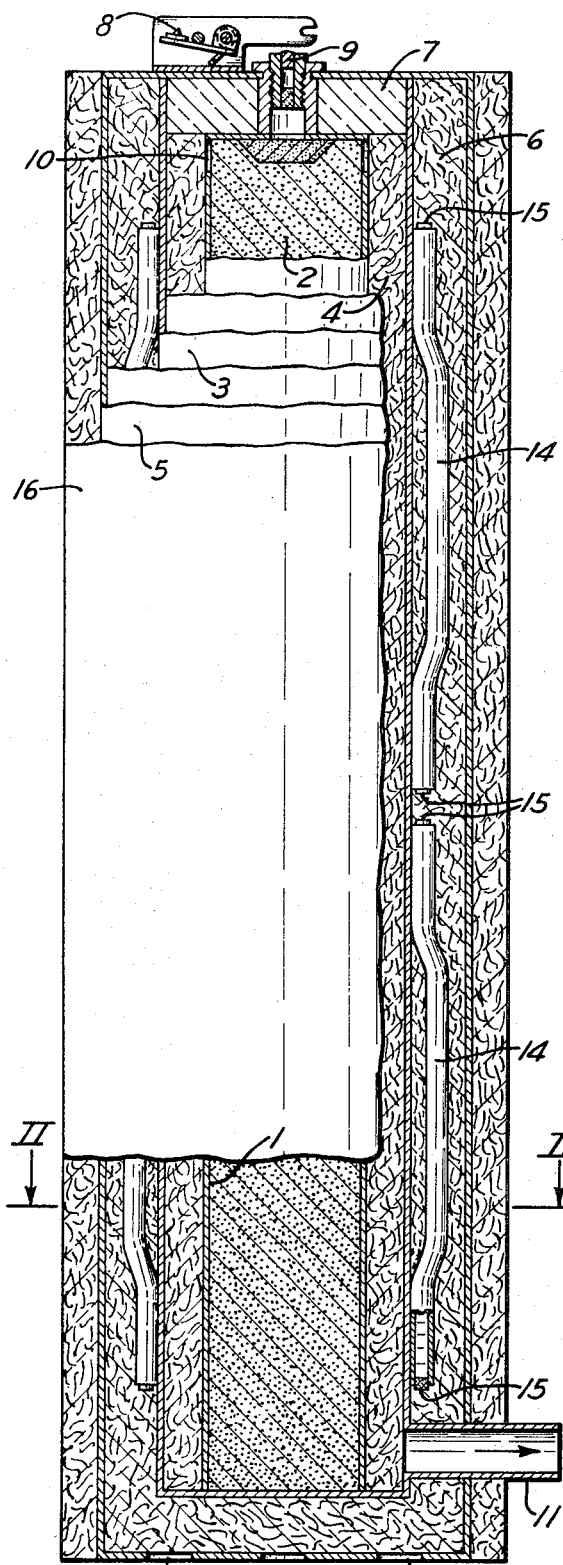
FIG. 1 is a side view, partly broken away and in vertical section.
Figure 2:
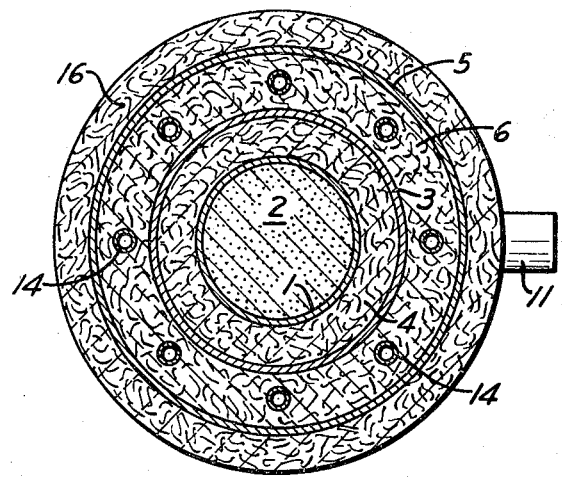
FIG. 2 is a cross section taken on the line II—II of FIG. 1.

Referring to FIGS. 1 and 2 of the drawings, a long cylindrical metal container 1 contains an oxygen producing candle 2 of well-known composition, such as a sodium chlorate candle. The container is surrounded by a metal shell 3 that is spaced from it and extends a short distance above it. The space between the two is filled with porous insulation 4 not affected by the heat of the candle. The shell is surrounded by a rigid housing 5 spaced from it, and the space between them likewise is filled with porous insulation 6. This insulation may be fibrous or a cast or molded insulation like fire brick, or any other insulation that will retain and distribute a liquid. The upper end of the shell is joined to the top of the housing; and an insulating disc 7 fills the space between the top of the container and the top of the housing.

Mounted on top of the housing is the usual spring-actuated firing pin 8 which, when released, will detonate an explosive charge 9 disposed in a passage extending down through the insulating disc and the top of the container. The explosion ignites the candle, which then proceeds to generate oxygen. Near the top of the container there are lateral outlet ports 10, through which the generated oxygen can escape into insulation 4 and then flow down through it to an outlet tube 11 extending through the shell and housing.

Although the layers of insulation around the candle will reduce the temperature of the housing to some extent, they will not lower it as much as may be desired. Accordingly, means are provided for introducing a liquid into the insulation between the shell and housing, where it will vaporize and carry heat away from the unit through vents 13 in the bottom of the housing. The liquid that is most suitable is water, but the invention is not limited to the use of water. Water is preferred because it is readily available, cheap, and has a high specific heat and heat of vaporization. Before being released into the insulation the water is contained in tubular means embedded in or surrounded by insulation 6. The tubular means may be one or more sets of circumferentially spaced tubes 14, for example, disposed around the shell. At least the end portions of these tubes engage or are very close to the shell so that they will be quickly heated by it when the candle burns. The ends of the water-filled tubes are sealed by suitable means 15 that may be melted by the heat or that will rupture or be dislodged when the water in the tubes becomes hot and expands. The temperature at which this occurs is preferably about 200°F.

Once the tubes have been opened in this way, the hot water will leave the tubes by capillary forces or by increase in vapor pressure and soak into the surrounding insulation. The water will flow to the hot surface of the shell and be vaporized and absorb the heat to maintain a bulk temperature in the insulation at approximately the boiling temperature of water at the ambient pressure. The vapor will leave through the vents 13 in the bottom of the unit. This will remove heat from the unit to such an extent that the outer surface of the casing will be held down to about 212°F. A very thin layer 16 of thermal insulation around the housing will reduce the surface temperature of the unit still further to around 150°F.

The heat sink thus formed will remove heat at all locations at a high rate so that the heat cannot build up in the unit. This unit has high heat sink capacity per unit of weight. It has a long storage life and good extreme temperature characteristics. The inner layer of insulation 4 also prevents too rapid cooling of the candle by the vaporized water, which could extinguish a candle made from a slow burning composition.

Figure 3:
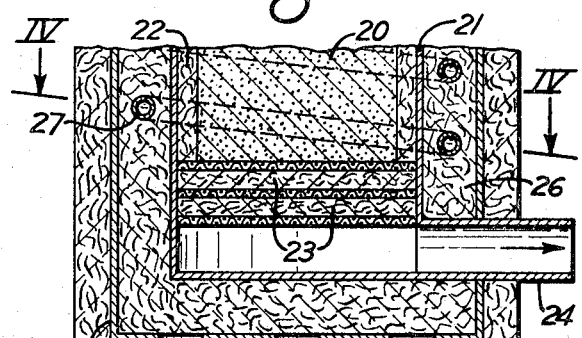
FIG. 3 is a fragmentary central longitudinal section of a modification.
Figure 4:
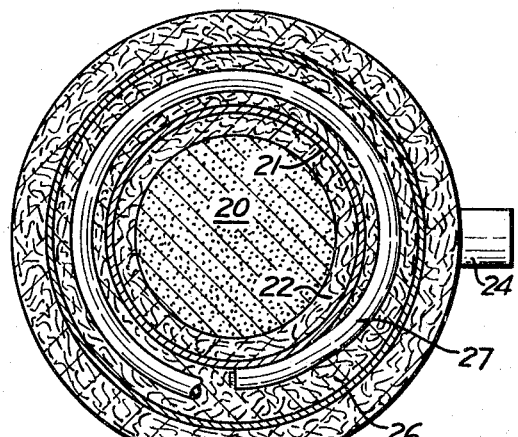
FIG. 4 is a cross section taken on the line IV—IV of FIG. 3.

In the modification shown in FIGS. 3 and 4, the candle container is omitted, but the candle 20 is spaced from the shell 21 by a thin layer 22 of insulation that forms an oxygen passage between them, so that oxygen produced at the burning end of the candle can flow along the candle and through filters 23 (FIG. 3) at its opposite end and then and out through a radial tube 24 through the shell and housing 25. The temperature of the unit is held down to a reasonable value by water vapor formed in the insulation 26 around the shell 21 after the heat from the candle has caused the sealed ends of tubes to open and release water. The tubes 27 are shown encircling the shell. They can be axially spaced substantially circular tubes with spaced ends, or axially spaced short spiral tubes as shown. The vapor passes down through insulation 26 and leaves the unit, with the heat it has picked up, through vents 28 in the bottom housing 25.

According to the provisions of the patent statutes, I have explained the principle of my invention and have illustrated and described what I now consider to represent its best embodiment. However, I desired to have it understood that, within the scope of the appended claims, the invention may be practiced otherwise than as specifically illustrated and described.

I claim:

1. An oxygen unit comprising an oxygen producing candle, means at one end of the candle for igniting it, a metal shell surrounding the candle and spaced therefrom, a rigid housing surrounding the shell, means spacing the housing from the shell to form a closed chamber between them, the housing being provided with a vent to atmosphere, said unit being provided with an oxygen passage connecting the inside of the shell with the outside of the unit, liquid-absorbent insulation filling the space between the shell and housing, liquid-filled tubes in said chamber embedded in said insulation around the shell, and means sealing the ends of the tubes, said sealing means being formed for destruction when heat from the burning candle raises the temperature of the tubes to a predetermined point, whereupon liquid will be released from the tubes into the insulation and will vaporize and escape through said vent to remove heat from the unit.

2. An oxygen unit according to claim 1, in which portions of said tubes engage said shell.

3. An oxygen unit according to claim 1, in which said tubes extend lengthwise of the shell and are spaced circumferentially around it.

4. An oxygen unit according to claim 1, in which said tubes encircle the shell and are spaced axially along it.

5. An oxygen unit according to claim 1, including a container for the candle provided with an outlet port at said one end of the candle, and a layer of thermal insulation between said container and shell.

6. An oxygen unit according to claim 1, including a layer of insulation engaging the candle inside said shell.

7. An oxygen unit according to claim 1, including a layer of insulation engaging the candle inside said shell, said oxygen passage including a conduit extending from the shell through said housing, and said unit having filtering means between the inner end of said conduit and said layer of insulation.

* * * * *